United States Patent
Unger (10) Patent No.: US 11,219,938 B2
(45) Date of Patent: Jan. 11, 2022

(54) METHOD FOR JOINING TWO METAL SHEETS WITH A VARIABLE TOTAL THICKNESS

(71) Applicant: Eckold GmbH & Co. KG, St. Andreasberg (DE)

(72) Inventor: Florian Unger, Bad Lauterberg (DE)

(73) Assignee: ECKOLD GMBH & CO. KG, St. Andreasberg (DE)

( * ) Notice: Subject to any disclaimer, the term of this patent is extended or adjusted under 35 U.S.C. 154(b) by 0 days.

(21) Appl. No.: 17/117,483

(22) Filed: Dec. 10, 2020

(65) Prior Publication Data

US 2021/0178448 A1 Jun. 17, 2021

(30) Foreign Application Priority Data

Dec. 11, 2019 (DE) .................... 10 2019 134 024.1

(51) Int. Cl.
*B21D 39/03* (2006.01)
*G05B 19/04* (2006.01)

(52) U.S. Cl.
CPC ................... *B21D 39/031* (2013.01)

(58) Field of Classification Search
CPC ............ B21D 39/031; G05B 19/0405
See application file for complete search history.

(56) References Cited

U.S. PATENT DOCUMENTS

| 9,957,992 B2 * | 5/2018 | Noe | ............... | B21C 47/247 |
| 2001/0002506 A1 * | 6/2001 | Hahn | ............... | B21J 15/025 29/407.1 |
| 2016/0138636 A1 * | 5/2016 | Noe | ............... | B21D 39/031 29/509 |

FOREIGN PATENT DOCUMENTS

| DE | 102015016957 | | 5/2016 | | |
| DE | 102015016957 A1 | * | 5/2016 | ........... | B21D 39/031 |
| DE | 202019104412 | | 8/2019 | | |
| DE | 202019104412 U1 | * | 8/2019 | ........... | B21D 39/034 |
| EP | 3020489 | | 5/2016 | | |

OTHER PUBLICATIONS

Search Report in EP Application No. 20212659.5-1016 dated May 19, 2021, 4 pages.

* cited by examiner

*Primary Examiner* — Bayan Salone
(74) *Attorney, Agent, or Firm* — Andrew M. Calderon; Roberts Calderon Safran & Cole, P.C.

(57) ABSTRACT

The disclosure relates to a method for joining metal sheets resting on one another with a variable total thickness by a clinching device comprising at least one punch and a die arranged coaxially to the punch. The punch is controllable by an electronic control unit and movable in an axial direction relative to the die. The metal sheets are arranged in a plane between the punch and the die, and the penetration depth necessary for joining the metal sheets is adjustable. Before joining the metal sheets, the current total thickness is determined with the aid of the control unit and the penetration depth is set depending on the total thickness. The method includes: storing a number of different total thicknesses or total thickness ranges in the control unit, assigning a penetration depth to a total thickness or to a total thickness range, and calibrating the clinching device.

14 Claims, 13 Drawing Sheets

METHOD FOR JOINING TWO METAL SHEETS WITH A VARIABLE TOTAL THICKNESS

FIELD OF THE INVENTION

The invention relates to a method for joining at least two metal sheets resting on one another with a variable total thickness by means of a clinching device comprising at least one punch and a die arranged coaxially to said punch, and at least the punch is arranged so as to be controllable by means of an electronic control unit and movable in an axial direction relative to the die, wherein the two metal sheets are arranged in a plane between the punch and the die, and the penetration depth necessary for joining the metal sheets is adjustable, wherein before joining the metal sheets, the current total thickness is determined with the aid of the control unit and the penetration depth is set depending on the total thickness.

BACKGROUND

A method of this type is described in EP 3 020 498 B1, for instance. DE 20 2019 104 412 U1 discloses a similar method.

In order to join metal two sheets lying on top of each other by way of deformation, they are placed on top of each other between the punch and the die. The sum of the sheet thicknesses of the first and second metal sheets gives the total thickness, which is therefore variable depending on the metal sheets used. The punch is lowered and pressed onto the metal sheets and presses the material into the die or into the cavity formed by the die and an anvil. In order to enlarge the cavity so that the displaced material can be accommodated, several die segments are usually provided, which can move transversely to the vertical axis of the main body during the deformation process. The anvil is pressed into the main body.

In order to achieve an optimally formed joint in terms of holding force and/or visual appearance, it is necessary to assign a die with a specially adapted die depth, which determines the penetration depth, to each joining task, which is defined in particular by the sheet thicknesses, the sheet materials, the sheet surfaces and/or the joining direction. In many cases, however, several different joining tasks have to be carried out on one component. In the operational application, it is then mainly for cost reasons that one is interested in realising as many joining tasks as possible with the same die, since the number of necessary joining devices and thus above all the investment costs incurred for their acquisition can be reduced.

If the depth of the die is fixed, different joining tasks can only be carried out with the same die if it is correspondingly averaged by accepting compromises. A compromise die depth allows the desired reduction in the number of necessary drive units, but has the disadvantage that in most cases none of the realised joining tasks exhibits an optimum characteristic with regard to appearance and/or holding force. If the depth is too great, the necessary holding force is lacking; if it is too small, the appearance suffers at the connection point.

A joining device is known from DE 10 2015 016 957 A1, which solves the above-mentioned problem by means of an anvil which is displaceably mounted in the main body and which should be designed to be fixable in different positions so that the die is at a different depth. However, this document does not explain how variable adjustment of the die depth and fixing of the anvil can be achieved.

With a clinching device in which the penetration depth is adjustable, metal sheets of variable thickness can be joined. Therefore, metal sheets of different thicknesses can be joined with the same device if the penetration depth is adapted to the respective total thickness of the metal sheets lying on top of each other. The adjustment of the penetration depth must be carried out by the machine operator. If the penetration depth is not set correctly, the same problem occurs as on devices where the die has a predetermined volume. If the penetration depth is set too large in relation to the total thickness of the two metal sheets, the necessary holding force is lacking; if the joining depth is set too small, the appearance at the joint suffer. In the worst case, it may even result in damage to the device.

A similar problem exists simply because fluctuations in sheet thickness cannot be excluded. Although the same type of metal sheet is processed over a longer period of time, the total thickness of the metal sheets lying on top of one another is subject to fluctuations in tolerance. If the thickness tolerances of the two sheets add up, it would be more sensible in some circumstances to increase the penetration depth in order to achieve a secure joint connection. However, detecting such tolerance fluctuations requires an extremely experienced and attentive machine operator.

SUMMARY

On this basis, the invention aims to improve the process described above in such a way that a good joint connection is produced on metal sheets with a variable total thickness and the process reliability is guaranteed, regardless of the experience of the machine operator.

This problem is solved by a process according to claim 1 or claim 9.

This configuration means that the volume of the die always matches the volume of the displaced material, so that a secure connection is created and damage to the device is impossible because the volume of the die will never be smaller than the volume to be displaced.

The penetration depth can be adjusted continuously or in steps.

The determination of the total thickness and the adjustment of the penetration depth is preferably achieved by way of the following steps:
 1. Storing a number of different total thicknesses or total thickness ranges of the control unit,
 2. In each case, assigning a penetration depth to a total thickness or to a total thickness range and subsequently
 3. Calibrating the clinching device.

To calibrate the clinching device, the punch is preferably moved from a zero position in the axial direction until it comes into contact with the die and the path covered by the punch then defines the zero position of the die, which is stored in the control unit.

The method according to the invention can preferably be implemented with the following steps:
 1. Positioning the clinching device in relation to the metal sheets to be joined so that the die rests against the lower side of the second sheet,
 2. Axially moving the punch into a position in which the punch rests against the upper side of the first metal sheet,
 3. Detecting the path covered by the punch,
 4. Determining the total thickness from the path covered by the punch and the calibrated zero position of the die, 5. Comparing the determined total thickness with the stored total thicknesses or total thickness ranges,
6. Selecting the value assigned to the defined total thickness for the penetration depth,
7. Adjusting the penetration depth depending on the comparison made, and
8. Joining the two metal sheets with the set penetration depth. Of course, the necessary remaining base thickness must be taken into account.

To adjust the penetration depth, an anvil is preferably provided which is arranged concentrically in the die and can be displaced in the axial direction relative to the die. The anvil is driven by an adjusting device, which is designed to be either wedge-shaped or stepped. If the adjusting device is wedge-shaped, the penetration depth can be infinitely adjusted; if the adjusting device is stepped, the penetration depth is adjusted in corresponding steps.

DETAILED DESCRIPTION OF THE DRAWINGS

In the following, the invention will be explained in more detail with the aid of the following figures:

FIG. 14c shows an enlarged detail according to FIG. 14a.

DETAILED DESCRIPTION

The metal sheets $B_1$, $B_2$ to be joined are inserted lying on top of each other between the upper tool carrier 10.1 and the lower tool carrier 10.2 of a clinching tool 10 of the known type. A punch 11 is mounted in the upper tool carrier 10.1 such that it can be displaced in the axial direction A. The die 12 is provided in the lower tool carrier 10.2, wherein the anvil 12.1 arranged concentrically to said die. 20 indicates an electronic control unit, which is used to control the clinching device 10 and its individual components. The anvil 12.1 is driven by the adjusting element 13, which is arranged so that it can be moved in its longitudinal direction L and can feature a stepped cross-section, as indicated in 13.1, or a wedge-shaped cross-section.

Figure 1:
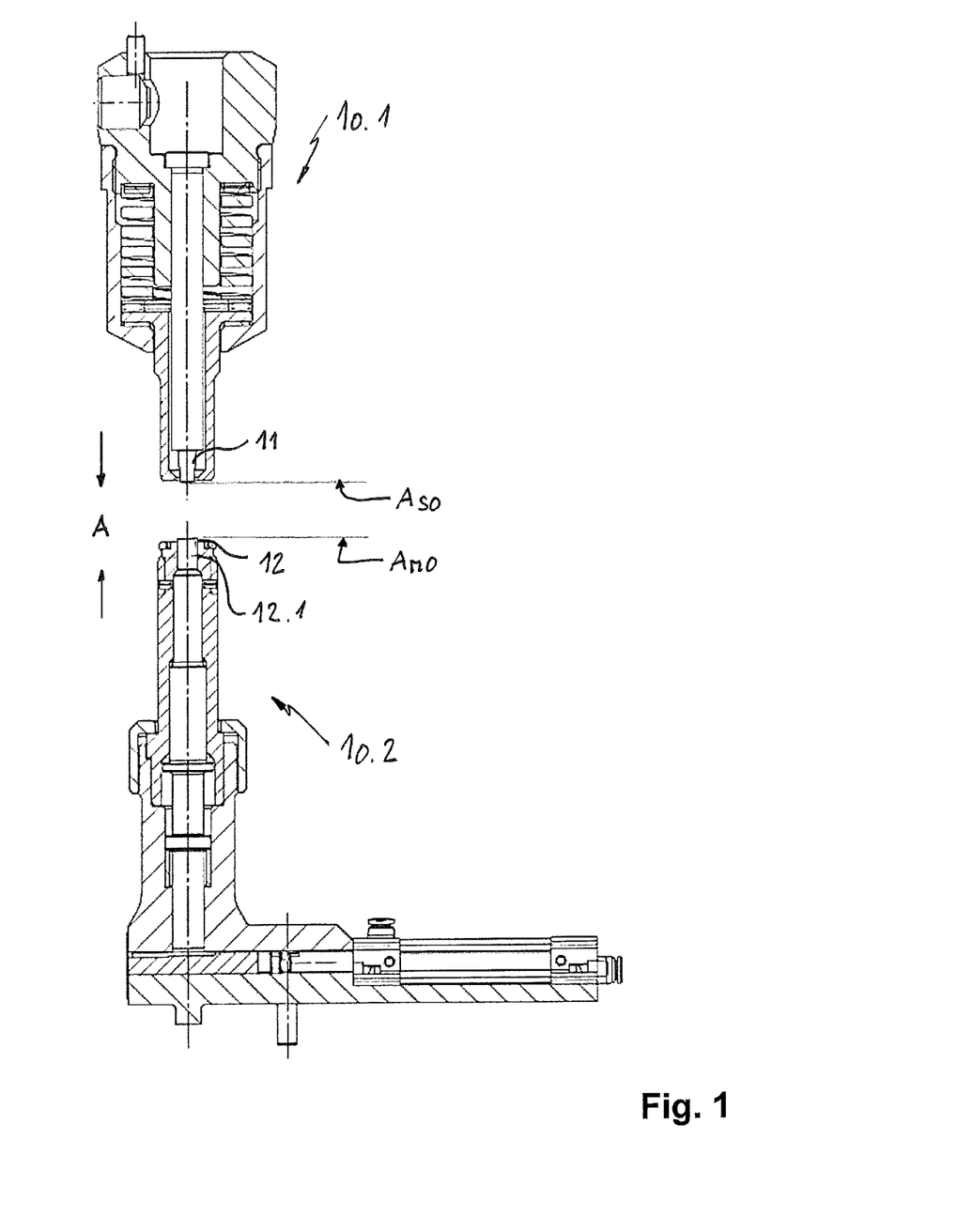
FIG. 1 shows a partial representation of a clinching device in its starting position in a longitudinal cut.
Figure 2:
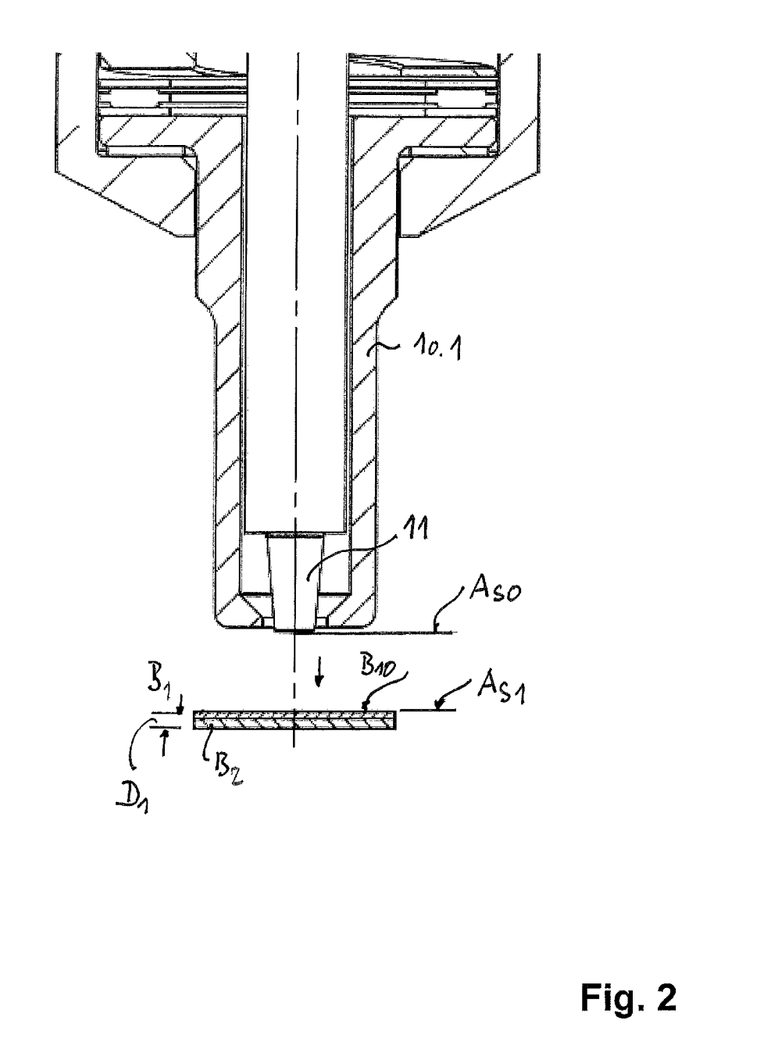
FIG. 2 shows an enlarged partial representation from FIG. 1.
Figure 3:
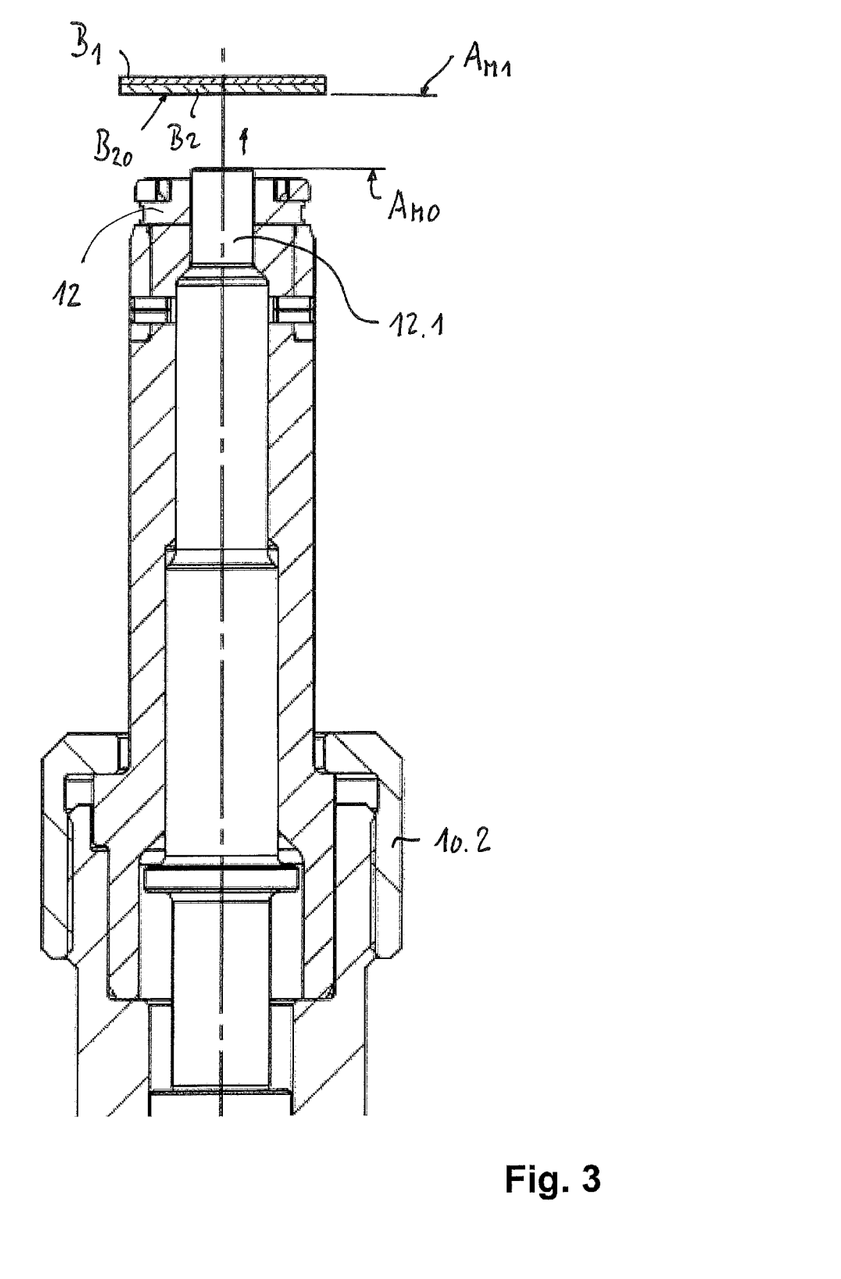
FIG. 3 shows a detail from FIG. 2.
Figure 4:
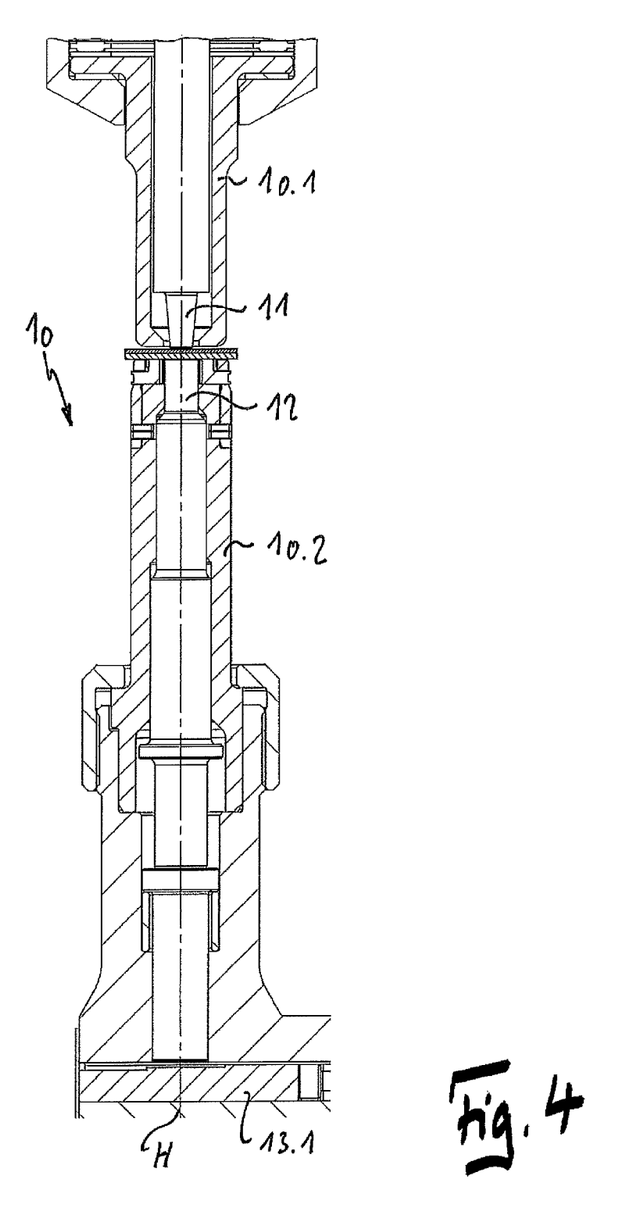
FIG. 4 shows a representation according to FIG. 1 in its measurement position.
Figure 5:
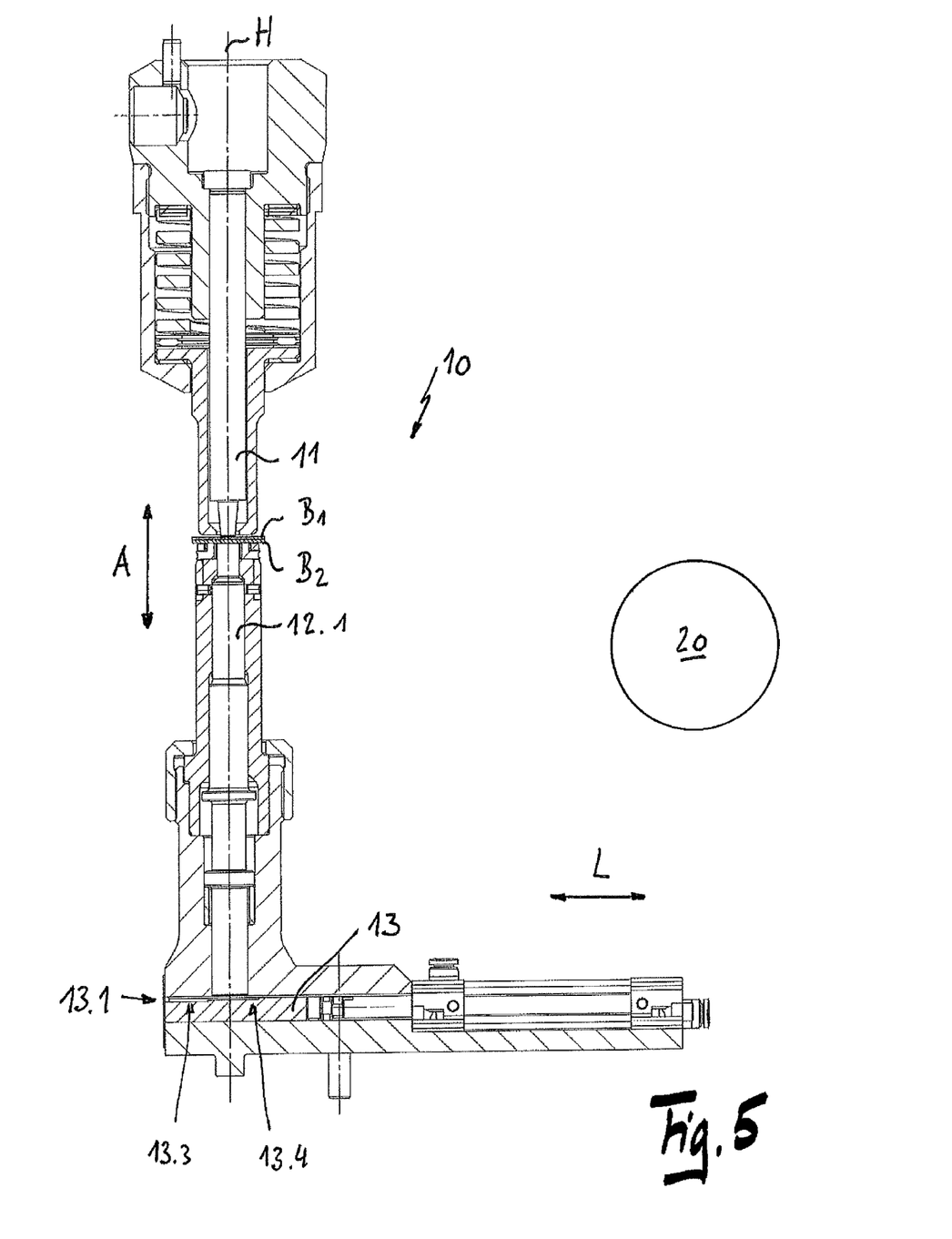
FIG. 5 shows an enlarged partial representation from FIG. 4.
Figure 6:
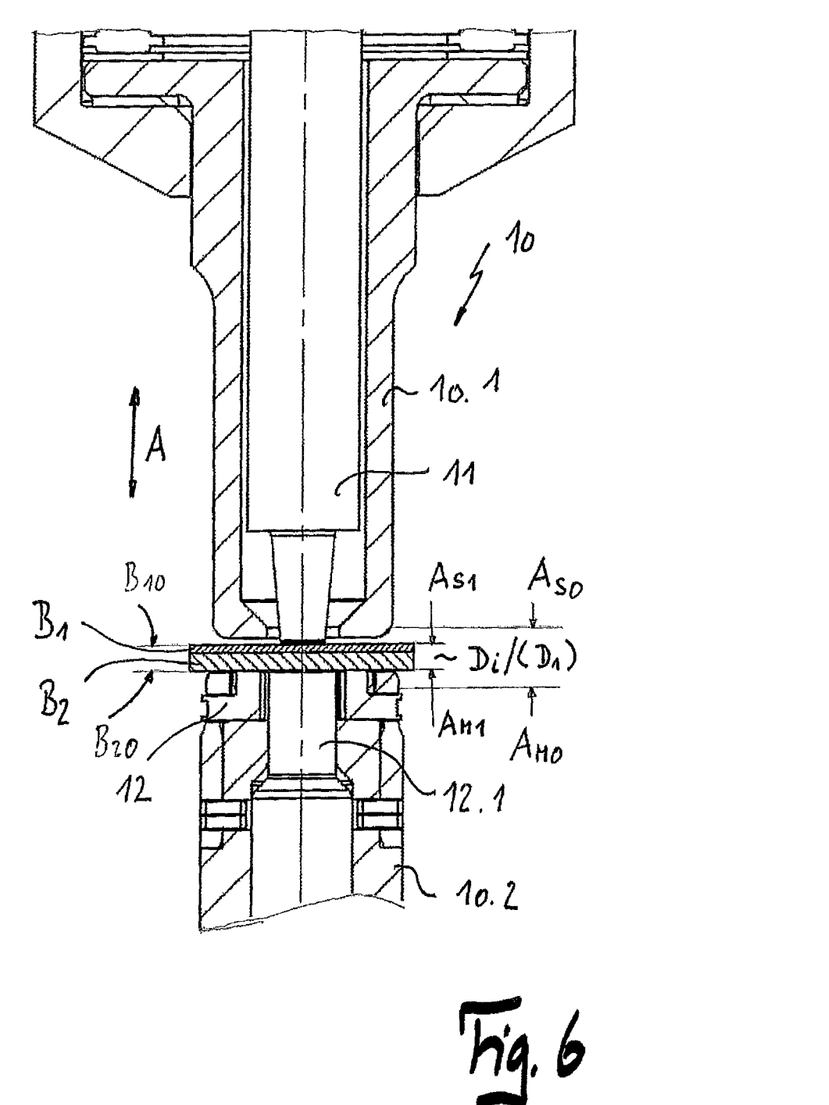
FIG. 6 shows a detail from FIG. 5.
Figure 7:
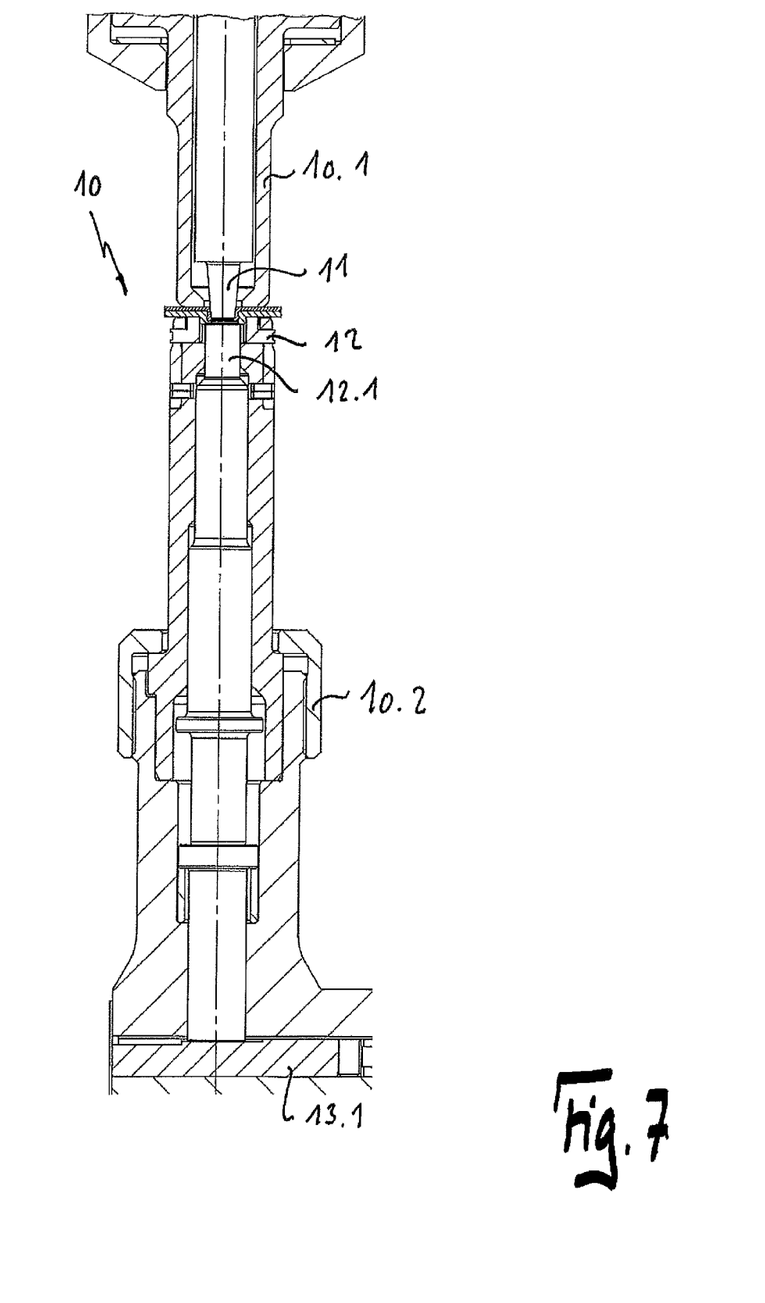
FIG. 7 shows a representation according to FIG. 1 after successful clinching.
Figure 8:
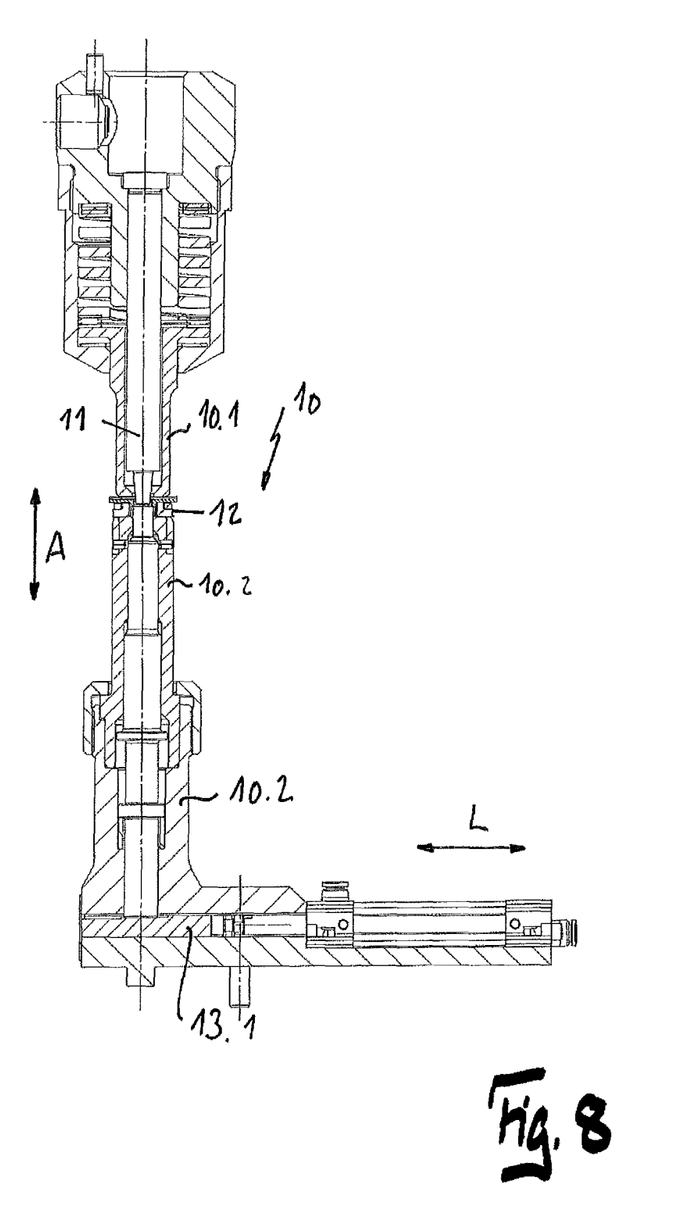
FIG. 8 shows an enlarged partial representation from FIG. 7.
Figure 9:
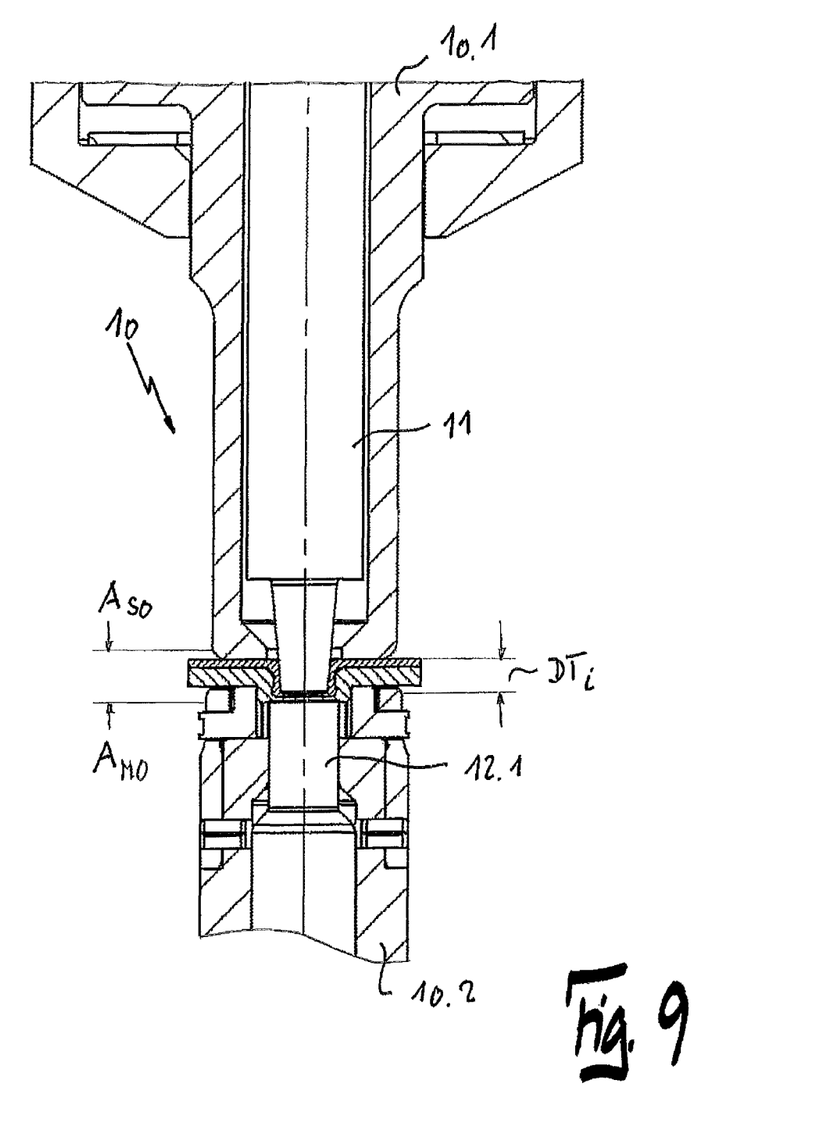
FIG. 9 shows a detail from FIG. 8.

The initial position of the clinching device 10 is shown in FIGS. 1 to 3. The punch 11 and die 12 are in their respective zero positions $A_{S0}$, $A_{M0}$. Once the metal sheets $B_1$, $B_2$ have been brought into a plane between the upper tool carrier 10.1 and the lower tool carrier 10.2, the punch 11 and the die 12 are moved in the axial direction A until the punch 11 rests on the upper side $B_{10}$ of the sheet $B_1$ and the die 12 on the lower side $B_{20}$ of the second sheet $B_2$, and the punch 11 and die 12 are then in their measuring positions $A_{S1}$, $A_{M1}$. The total thickness $D_1$ of the first metal sheet $B_1$ and the second metal sheet $B_2$ in this position corresponds to the distance between the punch 11 and die 12.

The penetration depth $DT_i$ must always be less than the total thickness $D_i$ of the metal sheets $B_1$, $B_2$. It results from the path of the punch 11 into the die 12 and the volume within the die 12 formed by the cavity 12.3, which is variable due to the anvil 12.1 which can be displaced in the axial direction A.

Different total thicknesses or total thickness ranges $D_i$ can be stored in the control unit 20 for different metal sheets $B_1$, $B_2$ to be joined together. Thickness ranges $D_i$ can include the sheet thickness±a given tolerance or different sheet thicknesses without tolerance.

The total thickness $D_1$ can be calculated from the fixed distance in the zero position of the punch 11 and die 12 and the path covered by the punch 11 from its zero position $A_{S0}$ and its measuring position $A_{S1}$ or the path covered by the die 12 from its zero position $A_{M0}$ to its measuring position $A_{M1}$.

If the total thickness $D_i$ of the metal sheets $B_1$, $B_2$ has been determined as above, this value is compared with the values $D_i$ stored in the control unit 20 and the penetration depth $DT_i$, which is assigned to the corresponding value in the control unit 20, is adjusted by moving the anvil 12.1 in the axial direction A from the lower side $B_{20}$ of the second sheet 2 into the interior of the die 12. If this penetration depth $DT_i$ is adjusted, the punch 11 is moved towards the die 12 and the two metal sheets $B_1$, $B_2$ are inserted into each other and thus joined.

The total thickness $D_i$ is determined before each joining process of the newly inserted sheets $B_1$, $B_2$ and is used for process monitoring. As long as the total thickness $D_i$ lies within a tolerable range, there is no adjustment of the penetration depth $DT_i$. If the penetration depth $DT$ is infinitely variable, it can be provided for that the control unit 20 individually adjusts the penetration depth $DT_i$ for each joining process by moving the anvil 12.1 in the axial direction A.

An alternative way to determine the total thickness $D_i$ of the two metal sheets $B_1$, $B_2$ is as follows:

Before the two metal sheets $B_1$, $B_2$ are inserted, the punch 11 is moved in the axial direction A on the die 12 until it is in direct contact with the anvil 12.1. The path covered by the punch 11 then defines the zero position $A_{M0}$ (FIG. 1) of the die 12, which is stored in the control unit 20. The metal sheets $B_1$, $B_2$ are placed in a plane between the die 12 and the punch 11. The clinching device is then positioned in relation to the metal sheets $B_1$, $B_2$ to be joined so that the die 12 rests against the lower side $B_{20}$ of the second sheet $B_2$. The punch 11 is moved in the axial direction A until it rests on the upper side $B_{10}$ of the first sheet $B_1$. The path covered by the punch 11 is then determined and the total thickness $D_i$ of the two metal sheets $B_1$, $B_2$ is calculated from the path covered by the punch 11 and the calibrated zero position $A_{M0}$ of the die 12. In this case too, a number of penetration depths $DT_i$ have been previously stored in the control unit 20. The determined total thickness $D_1$ is then compared with the stored total thicknesses or total thickness ranges $D_i$ and the value for the penetration depth $DT_1$ assigned to the determined total thickness $D_1$ is selected and the clinching process then started.

First Example of an Embodiment

Figure 10:
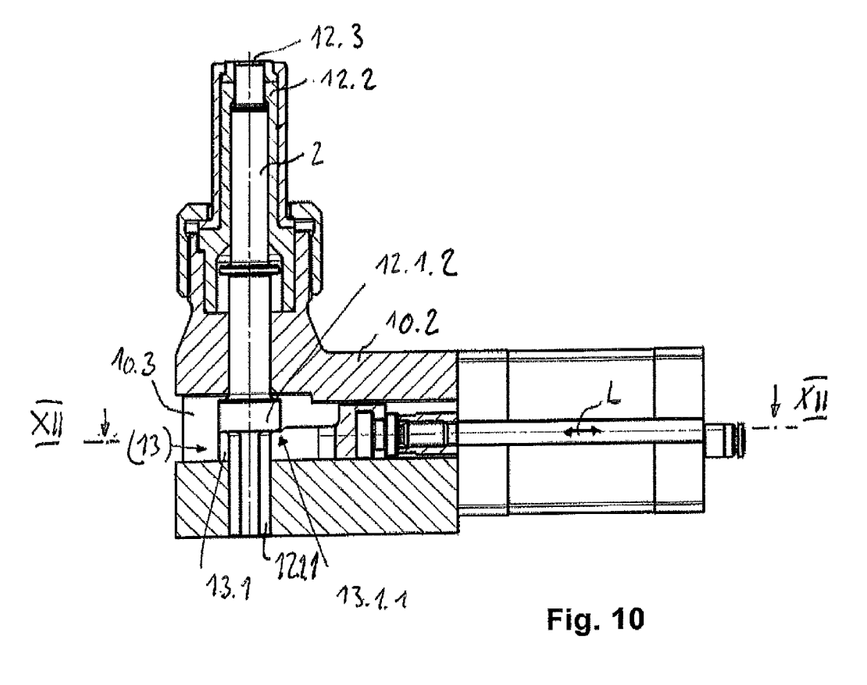
FIG. 10 shows a first embodiment of a die in a longitudinal cut.
Figure 11:
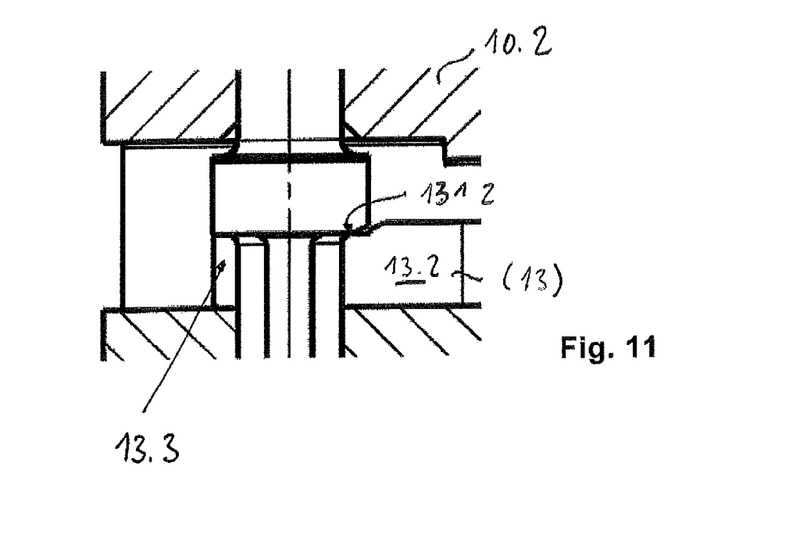
FIG. 11 shows an enlarged representation from FIG. 10.
Figure 12:
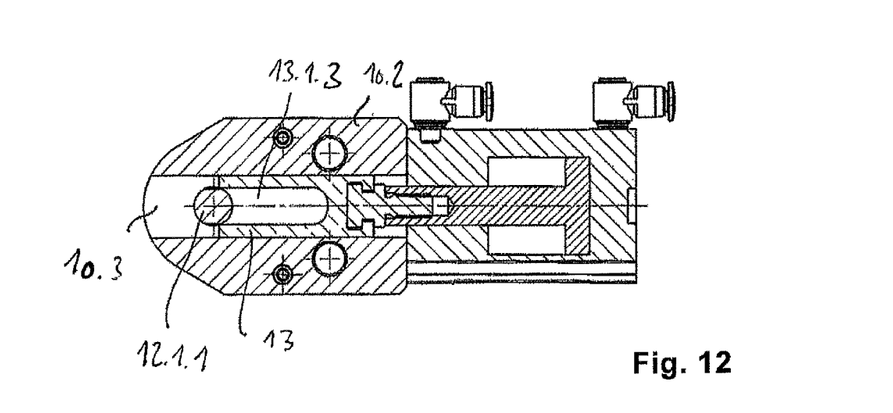
FIG. 12 shows a cut along the line XII-XII according to FIG. 10.
Figure 14A:
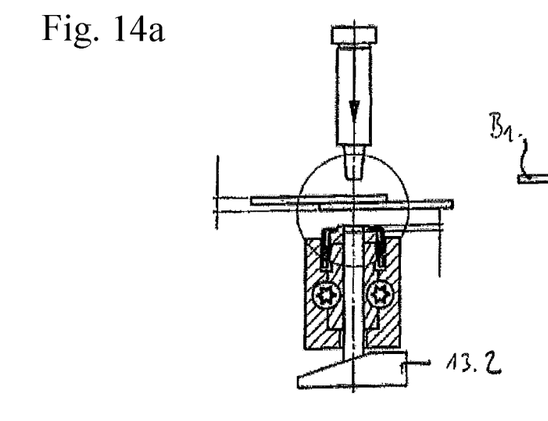
FIG. 14a shows a representation according to FIG. 13 before a joining procedure with a first joining task.
Figure 14B:
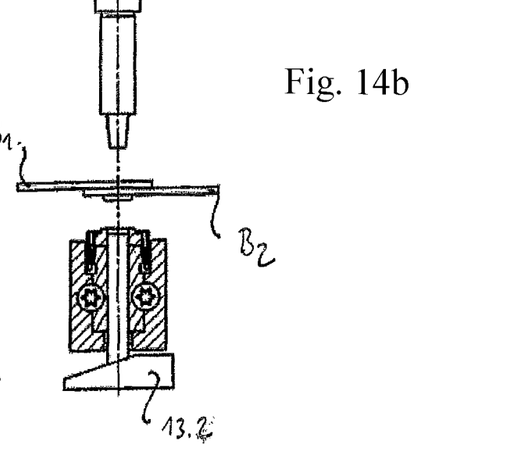
FIG. 14b shows a representation according to FIG. 14a after the joining procedure.
Figure 14C:
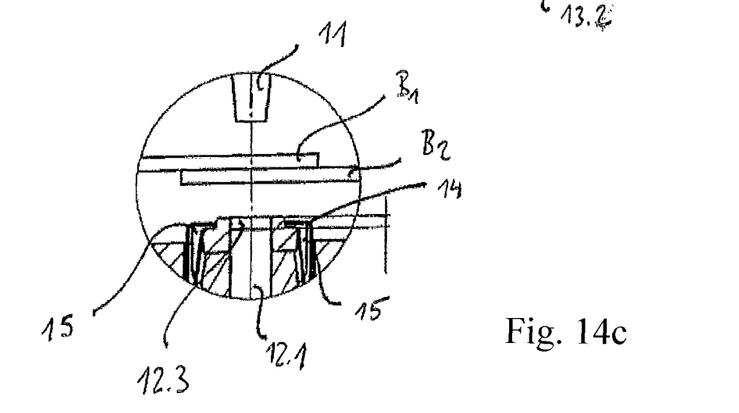

In the first example of an embodiment, which is shown more schematically in FIGS. 10 and 14, the die 12 consists mainly of the main body 12.2 and the anvil 12.1, which is mounted within said main body such that it can be displaced and fixed in at least two positions, and which together form a cavity 12.3 into which is inserted. The main body 12.2 of the die 12 is fixed in the lower tool carrier 10.2. Transversely to the joining direction (=axial direction A) an adjusting element 13 is provided, which is formed by a stepped adjustment slide 13.1, which is guided in a sliding manner in the longitudinal direction L in a recess 10.3 provided in the lower tool carrier 10.2. In the simplest case, the recess 10.3 is designed as a through-flow bore. In the case of a two-part tool carrier 10.2, it is formed by two grooves that lie opposite one another. The adjustment slide 13.1 is driven by electric motor, hydraulically or pneumatically. The adjustment slide 13.1 is provided with a slot 13.1.1 in the centre, through which the anvil 12.1 passes with its lower end 12.1.1 and is positioned in a bore provided in the lower tool holder 10.2 that extends in the joining direction. For better guidance in the slot 13.1.1 the lower end 12.1.1 of the anvil 12.1 is diametrically flattened, as shown in FIG. 11. The adjustment slide 13.1 is designed with a step 13.1.1, which is realized by a chamfer 13.1.2 and thus a first area that is thinner in the joining direction, with which a first, larger penetration depth DT of the die 12 is adjusted, and a second area that is thicker in the joining direction, with which a second, smaller penetration depth is set. The cavity 12.3 is therefore enlarged or reduced. By displacing the adjustment slide 13.1 in the longitudinal direction L, the annular bead 12.1.2 of the anvil 12.1 rests either on the first area 13.3, resulting in a larger penetration depth DT, or on the second area 13.4, resulting in a smaller penetration depth DT, and is supported in the tool carrier 10.2 by the adjustment slide 13.1. To be able to set more than two penetration depths DT, further steps can be provided in the adjustment slide 13.1. The angle of the chamfer 13.1.2 is selected in such a way that the bead 12.1.2 can easily slide up or down over the step 13.1.1. It is not absolutely necessary to slit the adjustment slide 13.1. The lower end of the anvil 12.1 could also be formed by the annular bead 12.1.2, which then forms a flange resting on the adjustment slide 13.1, if the guidance of the anvil 12.1 in the upper part of the tool carrier 10.2 is sufficient and an additional support in the lower part does not seem necessary. In this case, the adjustment slide 13.1 can be designed without a slot.

The die 12 can consist of several die segments 12a, 12b as described in the second example of an embodiment. The other components there can also be used in the die according to this first example of an embodiment. Only the adjustment device 13 is replaced.

Second Example of an Embodiment

The die 12 consists of the main body 12.2, the anvil 12.1, which is mounted in said main body such that it can be displaced and fixed in different positions, the opposite die segments 12a, 12b, which are mounted in a casing sleeve 14 which is essentially rectangular in cross section, open at the top and fixed to the main body 12.2, and the tool carrier 10.2 in which the main body 12.2 is fixed by means of screws 16.

The die segments 12a, 12b are mounted in the main body 12.2 such that they can be displaced transversely to the joining direction against the force of leaf springs 15.

The die segments 12a, 12b together with the upper end of the anvil 12.1 form a cavity 12.3 into which is inserted. To change the depth of the cavity 12.3, the position of the anvil 12.1 in the main body 12.2 can be infinitely varied and fixed in place in each case. To this end, a wedge 13.2, which is activated by an external force, is provided, which is also arranged such that it can be displaced transversely to the vertical axis H (=joining direction). In addition to the positioning movement, the wedge 13.2 also exerts a bearing force on the anvil 12.1, which determines the holding force required for joining.

The wedge 13.2 is preferably designed to be self-locking in order to absorb the necessary holding forces. Its drive is arbitrary. It is preferably hydraulic or pneumatic. A drive via a stepper motor or a lever mechanism is also conceivable.

In the position shown in FIGS. 14a to 14c, the anvil 12.1 is moved far upwards, so that a small cavity 12.3 is formed for joining thin metal sheets $B_1$, $B_2$. More specifically, FIG. 14a shows a representation according to FIG. 13 before a joining procedure with a first joining task. FIG. 14b shows a representation according to FIG. 14a after the joining procedure. FIG. 14c shows an enlarged detail according to FIG. 14a.

To join them, the metal sheets $B_1$, $B_2$ are placed on the die 12 and the punch 11 is moved towards the die 12. The material of the metal sheets $B_1$, $B_2$ is deformed into the cavity 12.3, wherein the die segments 12a, 12b are displaced transversely to the vertical axis (H) against the force of the leaf springs 15, thereby increasing the cavity 12.3 in the radial direction. Of course, the die 12 may also comprise only a single die element or several die segments that cannot be displaced.

Figure 13:
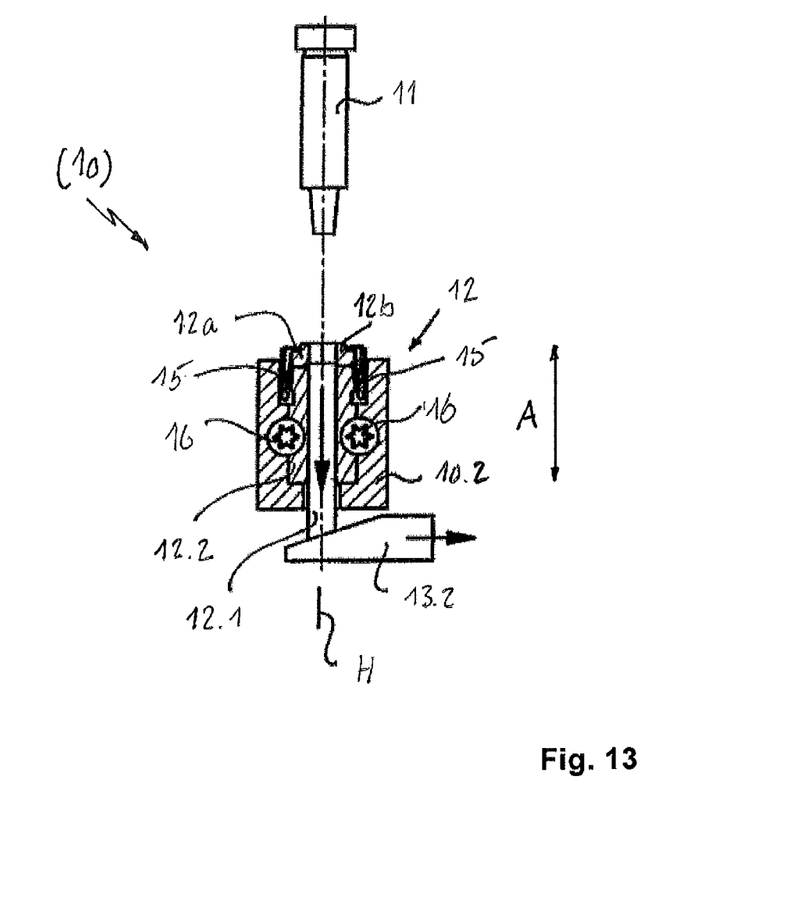
FIG. 13 shows the cross section of a die with a punch arranged above it.

In the joining task shown in FIG. 13, thicker metal sheets $B_1$, $B_2$ are to be joined together. For this purpose, the wedge 13.2 is displaced to the right (in the figure), thereby shifting the anvil 12.1 downwards and forming a larger cavity 12.3. Joining is conducted as described above. Instead of joining the overlapped metal sheets $B_1$, $B_2$ together by clinching them, they can also be joined suing semi-hollow self-piercing rivets. A rivet, not shown here, is then pressed into the cavity 12.3.

The explanations provided for this example of an embodiment can also apply in the same way to the first example of an embodiment if the wedge 13.2 is replaced by the adjustment slide 13.1 (and vice versa).

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A method for joining at least two metal sheets resting on one another with a variable total thickness by a clinching device comprising at least one punch and a die arranged coaxially to said punch, and at least the punch is arranged so as to be controllable by an electronic control unit and movable in an axial direction relative to the die, the metal sheets are arranged in a plane between the punch and the die, and a penetration depth for joining the metal sheets is adjustable, and before joining the metal sheets, a current total thickness is determined with aid of the control unit and the penetration depth is set depending on the current total thickness, and comprising:
    storing a number of different total thicknesses or total thickness ranges in the control unit;
    assigning the penetration depth to the total thickness or to the total thickness range; and
    calibrating the clinching device.

2. The method according to claim 1, wherein to calibrate the clinching device, the punch is moved from a zero position in the axial direction until it comes into contact with the die and a path covered by the punch then defines the zero position of the die, which is stored in the control unit.

3. The method according to claim 1, further comprising:
    positioning the clinching device in relation to the metal sheets to be joined so that the die rests against a lower side of a second sheet of the metal sheets;
    axially moving the punch into a position in which the punch rests against an upper side of a first metal sheet of the metal sheets;
    detecting a path covered by the punch;
    determining the current total thickness from the path covered by the punch and a calibrated zero position of the die;
    comparing the determined current total thickness with the stored total thicknesses or the total thickness ranges;
    selecting a value assigned to the determined current total thickness for the penetration depth;
    adjusting the penetration depth depending on the comparing; and
    joining the metal sheets with the adjusted penetration depth.

4. The method according to claim 1, wherein the penetration depth is infinitely variable.

5. The method according to claim 1, wherein the penetration depth can be adjusted in at least two steps.

6. The method according to claim 1, wherein to adjust the penetration depth, an anvil is arranged concentrically in the die and can be displaced in the axial direction relative to the die.

7. The method according to claim 4, wherein an adjustment device is provided to displace the anvil, said device being formed by a wedge.

8. The method according to claim 5, wherein an adjustment device is provided to displace the anvil, said device being formed by an adjustment slide that in its longitudinal direction comprises at least one effective step in the axial direction.

9. A method for joining at least two metal sheets resting on one another with a variable total thickness by a clinching device comprising at least one punch and a die arranged coaxially to said punch, and at least the punch is arranged so as to be controllable by means of an electronic control unit and movable in an axial direction relative to the die, wherein the metal sheets are arranged in a plane between the punch and the die, and the penetration depth necessary for joining the metal sheets is adjustable, wherein before joining the metal sheets, a current total thickness is determined with the aid of the control unit and the penetration depth is set depending on the current total thickness, comprising:
    storing a number of different total thicknesses or total thickness ranges in the control unit;
    assigning a penetration depth to the total thickness or to the total thickness range;
    axially moving the punch out of a first zero position into a position in which the punch rests against an upper side of a first metal sheet of the metal sheets;
    detecting a path covered by the punch;
    axially moving the die out of a second zero position into a position in which the die rests against a lower side of a second metal sheet of the metal sheets;
    detecting the path covered by the die;
    detecting a total thickness from a distance between the first zero position and the second zero position and the paths covered by the punch and die;
    comparing the detected total thickness with the stored total thicknesses or the total thickness ranges;
    selecting a value assigned to the detected total thickness for the penetration depth;
    adjusting the penetration depth based on the comparing; and
    joining the metal sheets with the adjusted penetration depth.

10. The method according to claim 9, wherein the penetration depth is infinitely variable.

11. The method according to claim 9, wherein the penetration depth can be adjusted in at least two steps.

12. The method according to claim 9, wherein to adjust the penetration depth, an anvil is arranged concentrically in the die and can be displaced in the axial direction relative to the die.

13. The method according to claim 10, wherein an adjustment device is provided to displace the anvil, said device being formed by a wedge.

14. The method according to claim 11, wherein an adjustment device is provided to displace the anvil, said device being formed by an adjustment slide that in its longitudinal direction comprises at least one effective step in the axial direction.

* * * * *